United States Patent

Hörvallius

[11] Patent Number: 5,862,602
[45] Date of Patent: Jan. 26, 1999

[54] METHOD AND MEANS FOR MEASURING THE WHEEL INCLINATION OR "CAMBER" OF A MOTOR VEHICLE

[76] Inventor: Torgny Hörvallius, Tallåsvägen 16 A, 806 41, Gävle, Sweden

[21] Appl. No.: 760,857

[22] Filed: Dec. 5, 1996

[30] Foreign Application Priority Data

Dec. 6, 1995 [SE] Sweden ................................ 9504360

[51] Int. Cl.⁶ ............................ G01B 5/255; G01C 9/28
[52] U.S. Cl. ........................................ 33/203.18; 33/371
[58] Field of Search ................................ 33/203.18, 333, 33/343, 347, 354, 370, 371, 372, 373, 374, 376, 383, 384, 385, 386, 387, 388, 389, 203.15, 203.16, 203.19, 534, 535

[56] References Cited

U.S. PATENT DOCUMENTS

| | | | |
|---|---|---|---|
| 2,729,896 | 1/1956 | Rosenblum | 33/347 |
| 3,071,863 | 1/1963 | MacMillan | 33/386 |
| 3,250,015 | 5/1966 | Piper | 33/347 |
| 4,011,659 | 3/1977 | Hörvallius | 33/203.18 |
| 4,015,339 | 4/1977 | Hörvallius . | |
| 4,135,823 | 1/1979 | Hörvallius . | |
| 4,635,376 | 1/1987 | Fry | 33/347 |
| 4,823,470 | 4/1989 | Hörvallius . | |
| 4,888,875 | 12/1989 | Strother | 33/347 |
| 5,103,569 | 4/1992 | Leatherwood | 33/343 |

*Primary Examiner*—Christopher W. Fulton
*Attorney, Agent, or Firm*—Flynn, Thiel, Boutell & Tanis, P.C.

[57] ABSTRACT

A method for measuring the wheel inclination or "camber" of a vehicle. In a wheel assembly, e.g. in the front axle and suspension assembly of the vehicle, the wheel planes are somewhat inclined in relation to a plane perpendicular to the floor or base, the inclination representing the so called camber angle. A simple method is proposed for determining the magnitude of the angle, independent of specific operating sites and sophisticated instruments. In a manner known per se, a wheel subject to camber measurement is provided with an axial extension in the form of a pin exactly coaxial with the wheel. The center line of said pin will thus incline in relation to the floor by an angle which equals the camber angle. On the floor, directly in front of the set of wheels, a rod or a like straight member is placed. An instrument provided with two mutually perpendicular levels is placed on the rod. The instrument has a bridge pivotable about an axis perpendicular to the center line of the bar, said bridge, in a first step, being set with its pivot axis truly horizontal and, in a second step, being pivoted so that its own plane becomes truly horizontal. The instrument is moved to the wheel pin and the procedure is repeated. The change of inclination which the bridge is subjected to in step 2 represents the camber angle.

17 Claims, 3 Drawing Sheets

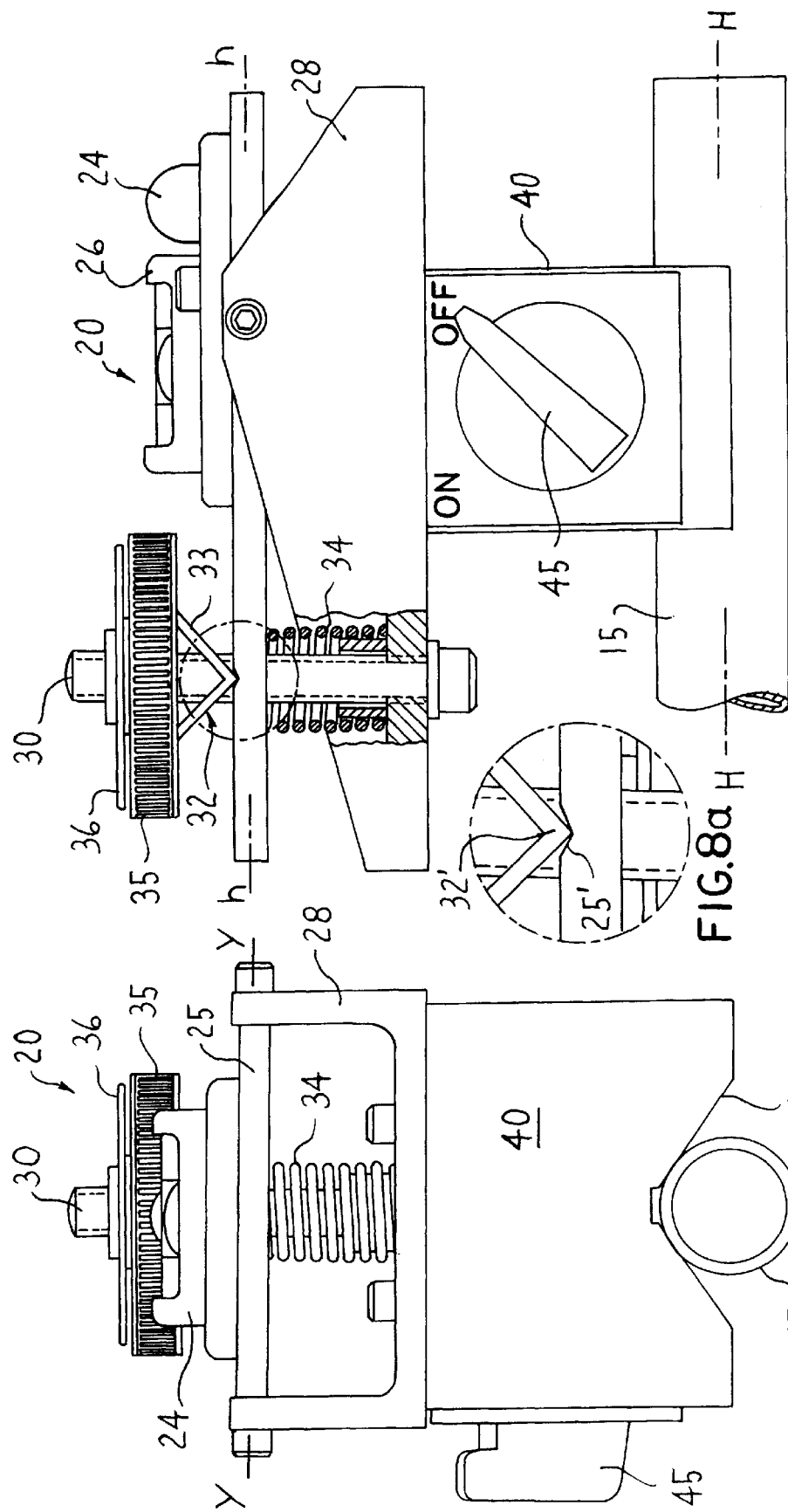

METHOD AND MEANS FOR MEASURING THE WHEEL INCLINATION OR "CAMBER" OF A MOTOR VEHICLE

FIELD OF THE INVENTION

The invention is directed toward a method and means for performing the method of measuring the wheel inclination or camber of a vehicle without demounting the wheels and without special levelled sites.

BACKGROUND OF THE INVENTION

The adjustment of the wheels and wheel axles of a motor vehicle is an intricate but important question, as the driving characteristics of the vehicle will depend greatly on how wheels and axles are aligned and adjusted. When driving straight ahead the rotational planes of the front wheels are inclined in various ways in relationship to a vertical plane, more particularly to a plane parallel with the vertical symmetrical plane of the vehicle. Viewed directly from above the wheels show "toe-in" or "toe-out", that is to say they are set at a slightly oblique angle to the direction of travel, whereas, when viewed directly from the front they tilt somewhat, preferably outwards, in relation to said vertical plane, by an angle designated as the wheel inclination or "camber". How the steering pivot pins or "king pins" of the front wheels are inclined in various vertical planes also have influence on the driving, and for a more detailed description of the wheel alignment angles in the front axle and suspension assembly of a motor vehicle reference is had to U.S. Pat. No. 4,823,470, where these conditions are discussed at length. In this patent there are also disclosed methods for determining accurately the magnitude of the angles concerned.

The invention has for its object to make available a simplified procedure for measuring, while maintaining accuracy, the most important one of the wheel alignment angles, viz., the said wheel inclination or camber. The object is achieved by providing a straight reference member, such as a rod or bar, which is placed on a base surface in front of and close to the wheels. One end of the reference member constitutes a reference pin which is parallel to the base surface and substantially parallel to a line extending between the wheel centers. The camber angle is determined by measuring the difference between the inclination to the true horizontal plane of the reference pin and the inclination to the true horizontal plane of a wheel pin. Further an arrangement for the implementation of the above method includes a measuring body which pivotably carries a plate-like bridge, with the pivot axis of the bridge being perpendicular to a guide groove located at the underside of the measuring body. The bridge pivots by means of a screw spindle mechanism operable by a knob. The knob is adapted to display the angle of the change in inclination of the bridge.

In order to exercise the invention it is necessary that the direction of the axis of rotation of the wheels subjected to measurement be established accurately, and a very simple so called centering device for this purpose is disclosed in U.S. Pat. No. 4,011,659, to which reference is also made.

BRIEF DESCRIPTION OF THE DRAWINGS

The invention will be described in the following with reference to the accompanying drawings, in which:

FIG. 7 is a front view of the prism of FIG. 6; and

FIG. 8 is a side view of the prism, whereas FIG. 8a shows an encircled portion of FIG. 8 on a larger scale.

DETAILED DESCRIPTION

Figure 1:
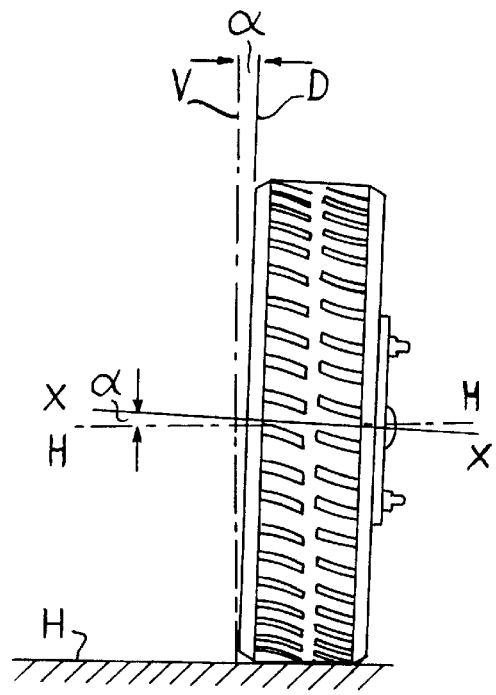
FIG. 1 is schematic front view of a wheel of a motor vehicle with the wheel inclination or camber angle indicated.

FIG. 1 shows a wheel of a vehicle as viewed directly from the front and resting upon a floor or base surface H. A plane perpendicular thereto is designated V, whereas a plane parallel to the wheel plane itself is designated D. The planes form an angle $\alpha$ with each other and, according to the foregoing definitions, the angle will thus represent the wheel inclination or camber. A line x—x represents the center line of the wheel and will thus extend perpendicularly to plane D. According to the simple geometrical relations the camber angle $\alpha$ is found between center line x—x and a line H—H parallel to the floor surface.

At this point of the description it seems appropriate to point out, with a certain emphasis, that when here and in the following "horizontal" or "vertical" planes or lines are discussed, true or absolute such planes or lines are not necessarily aimed at, that is to say, such planes which are perpendicular or parallel, respectively, to the direction of the gravitational force. The base or floor surface H according to FIG. 1 can be an ordinary workshop floor, and quite generally it can be said that it is "horizontal", but it is not very likely that it extends exactly perpendicular to the gravitational force; some small deviations do usually occur. As pointed out in the first mentioned patent this also means a complication in most conventional measurement systems for the wheel geometry of motor vehicles, as measurements require "levelled" planes or sites which are oriented exactly in relation to the direction of gravity.

According to the invention no such demands whatsoever on the premises are made, and the camber measurements described here can be carried out on any flat floor. The gravity and its direction has a role to play, as will be described, but only within a measuring instrument designed according to the invention. When "true" or "absolute" horizontal or vertical planes or directions are aimed at in this specification it will be pointed out expressly.

Figure 2:
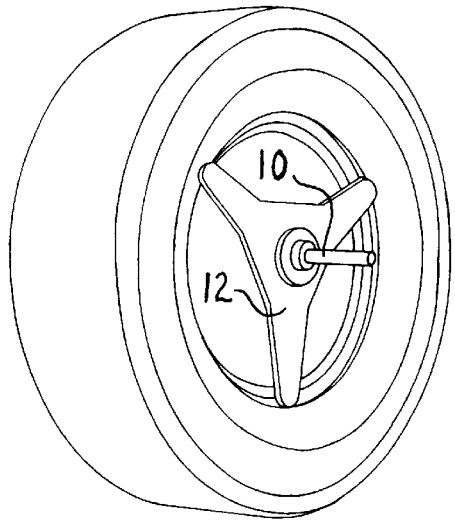
FIG. 2 shows a wheel with said centering device mounted.

In FIG. 2 there is shown a front wheel prepared for camber measurement and provided with a patented centering device 12 of the kind referred to above. The arrangement of this centering device means, in short, that a triangular support plate is clamped onto the outside of the rim of the wheel, and as disclosed in the patent a cylindrical pin 10 mounted on the plate can be brought, in a very simple manner, to assume a position exactly coaxial with the wheel, that is, the axis of the pin will coincide exactly with the rotational axis of the wheel.

A comparison with FIG. 1 thus shows that pin 10, with respect to its direction, coincides exactly with the center line x—x indicated in said Figure, a line which, indeed, also represents the rotational axis of the wheel.

Figure 3:
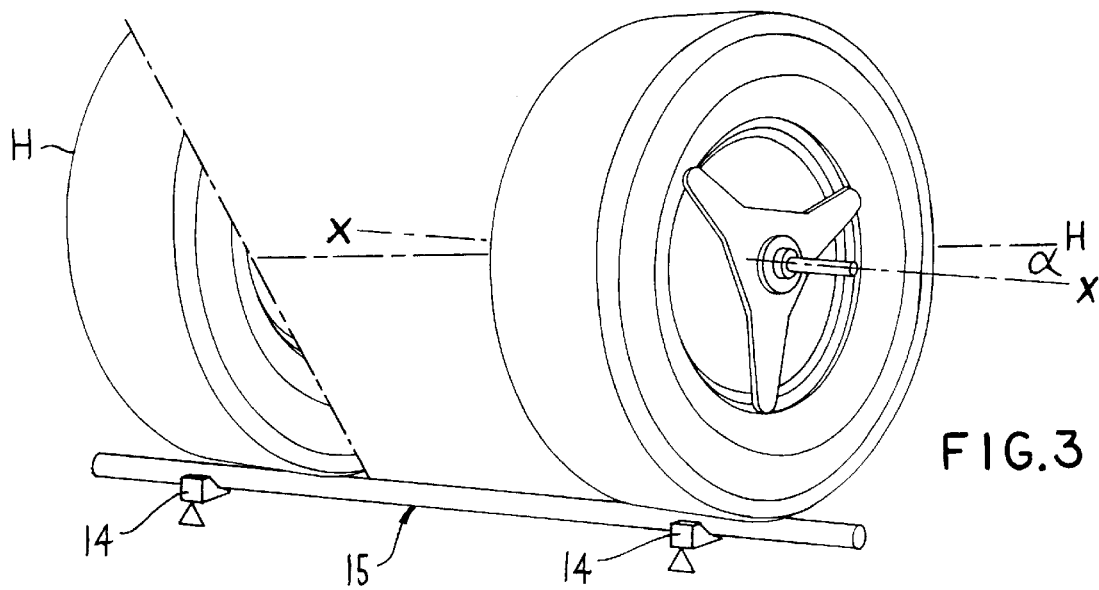
FIG. 3 shows schematically how the camber is found between the pin of the centering device and a horizontal plane through the centers of the wheels.
Figure 4:
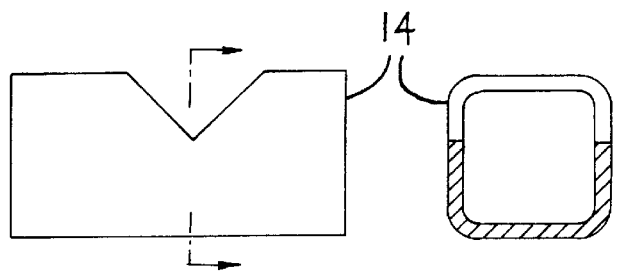
FIG. 4 illustrates a conventional V-block for use in exercising the invention, the block (a piece of square steel pipe) being shown in elevation and vertical section.

In FIG. 3 the starting position for establishing, in accordance with the invention, the camber angle α of a front wheel is illustrated diagrammatically. Two parallel wheels are shown, e.g. two front wheels. A rod 15 rests in a pair of V-blocks 14 (see FIG. 4) situated straight in front of and symmetrically in relation to the respective wheel. The V-blocks 14 are exactly alike and rest on a base which corresponds to the plane H of FIG. 1 and is represented by black triangles in FIG. 3.

It is assumed that the two wheels are mutually alike, that is to say, their centers are situated on the same level above the base upon which the V-blocks 14 rest. A deviation could be caused e.g. by the tires being differently worn, which can be compensated for by adjusting their air pressure. By measuring on either side, by means of a simple so called "height gauge", the height above the base surface of the lower edges of the wheel rims, it is possible to check that the rims and thus also the wheel centers are on the same elevational level on both sides.

By this assumption the "horizontal" line H—H (parallel with the base H) according to FIG. 1 will also strike the center of an opposite wheel and therefore the same line H—H is found in FIG. 3. According to the arrangement, the rod 15 resting on the base in the front of the wheels will obtain the same direction H—H.

In accordance with the foregoing a centering device 12 has been mounted on one of the wheels, and when its pin 10 has been set it will thus project perpendicularly to the rotational plane of the wheel. Thus the angle between the center line x—x of the pin and the horizontal line H—H through the wheel centers has to be the camber angle sought.

Figure 5:
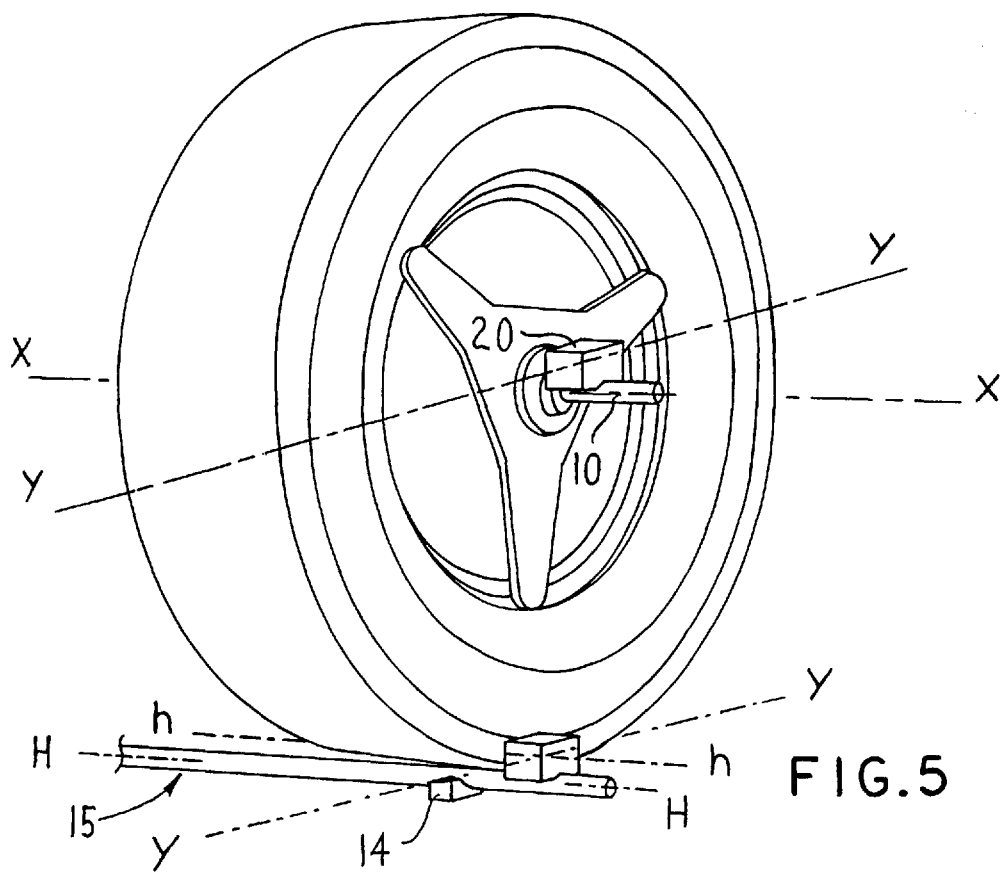
FIG. 5 illustrates schematically the principle according to the invention of establishing the camber angle.

In FIG. 5 it is shown diagrammatically how this difference, representing the camber angle, between the inclination of pin 10 and that of rod 15 can be established with reference to a "true" horizontal plane according to the foregoing definition, without any such plane having to be created in reality. Instead, relative changes in relationship to such a plane is utilized by a gravity sensing instrument, shown in FIG. 5 as a prismatic body 20, called "measuring prism" in the following. This instrument can be placed on rod 15 as well as on pin 10 and by a magnetic lock, known per se, it can be temporarily locked onto said rod and pin, respectively.

Figure 6:
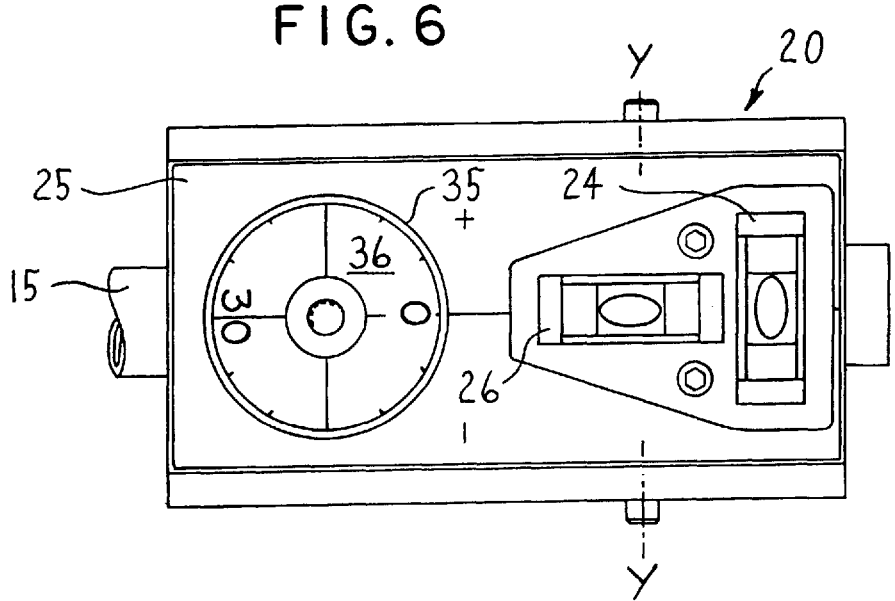
FIG. 6 shows a plan view of a measuring instrument or "measuring prism" according to the invention, to be used when determining the camber angle.

The topside of prism 20 is shown in FIG. 6. The instrument will be disclosed in greater detail in the following, but from FIG. 6 it can be seen that it includes a bridge 25, which can pivot on journal pins about a pivot axis y—y. This axis extends perpendicularly to the supporting rod 15 or pin 10, and the pivot position of the bridge can be adjusted by means of a knob 35. Two levels 24 and 26 sensing the true horizontal position are located on the bridge 25 exactly perpendicular to one another. The first level 24 extends perpendicularly to the rod or pin, respectively, upon which the prism has been placed, whereas the second level 26 will thus extend in parallel with said members. FIG. 6 illustrates the position on rod 15 of the measuring prism in accordance with the prerequisites given.

In order to determine the camber angle α the measuring prism is first placed on rod 15. If it is turned about the rod it can obviously, by means of level 24, be set with its traverse direction represented by axis y—y truly horizontal. In this position the instrument is locked onto the rod by means of said magnetic locking device. The bridge 25, thus extending in the longitudinal direction of rod 15, can now as a whole be set in a truly horizontal position by it being turned about its axis y—y by means of knob 35, and the change in position can be observed on level 26.

The situation is now as follows, see FIG. 5. Rod 15 rests in its V-blocks 14 on the base in front of the wheel, which rests on the same base. As this consists of an ordinary non-levelled workshop floor or the like, the direction H—H of rod 15 in relation to the true horizontal is unknown. However, as just described, the measuring prism 20 as a whole, bridge 25 included, has been set with its transverse direction, represented by axis y—y in FIG. 6, exactly horizontal, and this line reappears in FIG. 5. In the next step the movable bridge 25 of the measuring prism has been set exactly horizontal in its longitudinal direction as well, which is indicated by line h—h in FIG. 5.

Now, if the measuring prism 20 is removed from rod 15 and placed on pin 10 instead, see FIG. 5, in analogy with the foregoing it can first be rotated about pin 10 and locked after axis y—y has been brought to be truly horizontal. If now pin 10 were exactly parallel with rod 15, that is, the wheel were not inclined, level 26 should not indicate any change in relation to its position on rod 15. But if it is assumed that the wheel is mounted with a certain inclination, e.g. a few minutes outwards, pin 10 will point somewhat downwards, which means that level 26 on bridge 25 will deviate, and in order to restore its position bridge 25 must be rotated a small angle, and in accordance with the prerequisites given the restoring angle must be, indeed, the angle of camber α.

The bridge is rotated by means of knob 35, and as will be disclosed in the following the knob is so arranged and graduated that it indicates directly the restoring angle and thus the camber angle α.

Measuring prism 20 will now be described in greater detail with reference to, besides FIG. 6, also FIGS. 7, 8 and 8a.

As shown in the last mentioned Figures measuring prism 20 has a U-shaped body 28, onto whose underside the said magnetic locking device, here designated 40, is secured. The locking device is provided in its underside with a V-groove 42, which extends exactly in the longitudinal direction of the U-shaped body 28. In order to offer more possibilities of orientation a further V-groove (not shown) perpendicular to groove 42 can be provided on the underside of the locking device. Locking on and off can be controlled by a handle 45.

As mentioned above, the rotation of bridge 25 is operated by means of knob 35 which is arranged as shown in greater detail in FIG. 8. A screw spindle 30 secured in the body extends through an opening in bridge 25, which bridge 25 is urged upwards by a compression spring 34 inserted between the underside of the bridge and the bottom of U-shaped body 28. Knob 35 can be screwed up and down on screw spindle 30, and between the underside of the knob and the top side of bridge 25 a short angular piece 32 is inserted, which has a central opening through which spindle 30 extends. Furthermore, the angular piece 32 is placed with the ends of its shanks 33 in sliding contact with the underside of knob 35, said ends being smoothed off, whereas the corner edge 32' of the piece rests in a notch 25' of crossing bridge 25, as shown in FIG. 8.

Now, notch 25' extends exactly perpendicularly to bridge 25 and thus parallel with the pivot axis y—y of the bridge, and the arrangement is such that the perpendicular distance between the pivot axis of bridge 25 and the centre axis of screw spindle 30 is equal to the distance between said pivot axis and notch 25' on the bridge. From a strict geometrical view these distances change somewhat in relation to one another when knob 35 is screwed up and down, causing bridge 25 to pivot, but the pivoting movement is small and in practice the distances differ insignificantly; they can be considered equal and are designated R. It is noted, see FIG. 8a, that angular piece 32 is allowed to tilt a little in notch 25' about its corner edge 32' during the adjustment movement, to further ensure that distance R be altered as little as possible.

Preferably, screw spindle 30 consists of a standard internal hexagon head screw secured in the bottom of body 28 and having threads of pitch 1 mm. Furthermore, distance R is so adjusted that turning knob 35 one revolution in either direction, which thus means that the knob itself together with angular piece 32 and the bridge will move, at notch 25', up or down 1 mm, will cause bridge 25 to rotate through a desired angle. If, for example, it is desired that this angle be 10, simple geometry gives that the distance R must be $180/\pi = 57.30$ mm. Turning knob 35 one revolution will thus cause bridge 25 to rotate 1°=60 minutes. Thus, knob 35 can suitably be graduated in minutes, as indicated in FIG. 6. However, for the purpose of the invention the graduation is made in a disc 36, adjustable in relation to knob 35, which disc follows the movement of knob 35 through a simple frictional coupling device but can be readily reset in relation to the knob while overcoming the friction between knob and disc.

As explained above, the camber angle $\alpha$ could be determined by measuring the angle through which bridge 25 has to be rotated, with measuring prism 20 placed on pin 10, in order to assume the same true horizontal position as when placed on rod 15. In accordance with the above, the change of angle can be observed directly on disc 36 of knob 35 by the disc being zeroed at the operations on rod 15; in the final operations on pin 10 the angular change=the camber angle can thus be read directly on the scale of disc 36. It is pointed out that in practice it is desired that the camber angle be accurately determined, and as shown above the measuring prism according to the invention will give the camber angle by an accuracy of minutes.

What characterizes the invention is the swiftness and surprising accuracy by which the camber angle of wheels and axles of a motor vehicle can be determined by the light and unbulky instruments described. These instruments, thus measuring prism 20 and bar 15 with V-blocks 14, can be used substantially anywhere with no particular demands being made on the premises. However, it is pointed out that the technical devices here described can be modified and varied in many ways within the scope of the invention, and this is thus not limited to the embodiments shown and described.

I claim:

1. A method for measuring the wheel inclination or camber of a vehicle without demounting the wheels of the set of wheels subject to measurement and without requirement for special or levelled sites for carrying out measuring, said measuring being performed, with the wheels resting on a substantially plane floor or base with their centers on the same level above said base, by a first of the wheels subject to measuring being provided with an axial extension on one side in the form of a cylindrical pin which is secured to the wheel with its axis parallel with or coinciding with the rotational axis of the wheel, wherein a straight reference member in the form of a rod, bar or the like, whose one end at least constitutes a coaxial, cylindrical reference pin similar to said wheel pin, is placed on the base in front of and close to the wheels of the wheel set with said reference pin parallel with the base and approximately parallel with a line between the wheel centers, the reference member being carried in two alike V-block support members; and further wherein the difference between the inclination to the true horizontal plane of the reference pin and the inclination to said true horizontal plane of the wheel pin is measured by means of an instrument adapted to sense and indicate the direction of the gravitational force, said difference being the value of the wheel inclination or camber sought.

2. A method according to claim 1, wherein a measuring body including the instrument adapted to sense and indicate the gravitational force is placed on a selected one of the pins, for example, the reference pin which, like the wheel pin, fits slidably in a guide groove formed in the underside of the measuring body, said instrument adapted to sense and indicate the gravitational force being pivotable and having a pivot axis oriented perpendicularly to said guide groove, the reference pin and the wheel pin; said method including:

rotating the measuring body on the reference pin and pivoting the instrument adapted to sense and indicate the gravitational force on the measuring body until a position is reached wherein the instrument indicates that it is situated in the true horizontal plane; moving the measuring body to the other one of the pins, for example the wheel pin; rotating the measuring body on the wheel pin and pivoting the instrument on the measuring body until the instrument indicates again that it lies in the true horizontal plane; and wherein the angle through which said instrument has to be pivoted about its axis in order to restore its true horizontal position is recorded, as this angle is the camber angle sought.

3. An apparatus for measuring the wheel inclination or camber of a vehicle by providing a wheel of a wheel set subject to measurement with a concentric axle pin, placing a straight reference member in front of the wheel set and carrying out the measurements by means of a measuring body adapted for sensing the direction of gravity, the measuring body including a plate-like bridge pivotably carried on the body and having a pivot axis oriented perpendicularly to a guide groove provided in an underside of the measuring body, the bridge being pivotable by means of a screw spindle mechanism operated by a knob wheel adapted to show on a graduated scale the angle of the change in inclination of the bridge, an angular position of the bridge being indicated by two levels situated on the bridge, whereby one level is oriented parallel with the pivot axis of the bridge and the other level is oriented perpendicularly to the first level, the measuring body further including framework pivotably carrying said bridge, said bridge being actuated by a spring in one pivot direction, said screw spindle mechanism including a screw spindle secured in the framework and extending substantially perpendicularly to the bridge through an opening in said bridge for engagement with the knob wheel which limits, by engaging a top side of the bridge, the spring-actuated movement of the bridge.

4. An apparatus according to claim 3, wherein said guide groove is provided in a magnetic locking body secured on the underside of said framework, said locking body being configured such that its magnetic locking effect can be switched on and off by means of a handle.

5. An apparatus according to claim 3, including a reference member comprising a straight tube.

6. The apparatus of claim 3 wherein a spacing member having a straight edge is disposed between a top side of the bridge and an underside of the knob wheel, the spacing member being disposed against the underside of the knob wheel but engaging with the edge thereof in a notch in the bridge, the notch being parallel with the pivot axis of the bridge and extending perpendicularly to an axis of the screw spindle said notch being configured to permit the spacing member to tilt within the notch during pivoting movements of the bridge.

7. The apparatus of claim 6 wherein the screw spindle mechanism is specifically adjusted in relation to the pivot movement of the bridge such that a screw thread pitch of the screw spindle is 1 mm and the perpendicular distance between the spindle axis of the screw spindle and the pivot axis of the bridge is $180/\pi$ or 57.30 mm, so that turning the knob wheel one revolution will cause the bridge to pivot 1°, the measuring body including a disc having a graduated scale mounted concentrically on the knob wheel, the disc being frictionally adjustable on the knob wheel in order to indicate, from a starting or zero position, a change in the inclination of the bridge.

8. The apparatus of claim 3 wherein the guide groove is provided in a magnetic locking body secured on the underside of the framework, the locking body being configured such that its magnetic locking effect can be switched on and off by means of a handle.

9. An apparatus for measuring the wheel inclination or camber of a vehicle by providing a wheel of a wheel set subject to measurement with a concentric axle pin, placing a straight reference member in front of the wheel set and carrying out the measurements by means of a measuring body adapted for sensing the direction of gravity, the measuring body including a plate-like bridge pivotably carried on the body and having a pivot axis oriented perpendicularly to a guide groove provided in an underside of the measuring body, the bridge being pivotable by means of a screw spindle mechanism operated by a knob wheel adapted to show on a graduated scale the angle of the change in inclination of the bridge, an angular position of the bridge being indicated by two levels situated on the bridge, whereby one level is oriented parallel with the pivot axis of the bridge and the other level is oriented perpendicularly to the first level, the measuring body further including a spacing member having a straight edge disposed between a top side of the bridge and an underside of the knob wheel, the spacing member being slidable against the underside of the knob wheel but engaging with the edge in a notch in the bridge, the notch being parallel with the pivot axis of the bridge and extending perpendicularly to an axis of a screw spindle of said screw spindle mechanism, said screw spindle extending substantially perpendicularly to the bridge, said notch being configured to permit and is the spacing member to tilt within said notch during the pivoting movements of the bridge.

10. An apparatus according to claim 9, wherein the screw spindle mechanism is specifically adjusted in relation to the pivot movement of the bridge such that a screw thread pitch of the screw spindle is 1 mm and the perpendicular distance between the spindle axis of the screw spindle and the pivot axis of the bridge is $180/\pi$ or 57.30 mm, so that turning the knob wheel one revolution will cause the bridge to pivot 1°, the measuring body including a disc having a graduated scale and being mounted concentrically on the knob wheel, said disc being frictionally adjustable on the knob wheel in order to indicate, from a starting or zero position, a change in the inclination of the bridge.

11. An apparatus for measuring wheel camber of a pair of vehicle wheels, one of the wheels having mounted thereon a centering device including a support plate positioned against an outside rim of the one wheel and a pin member extending from the support plate and coinciding with a rotational axis of the one wheel, said apparatus comprising:

a measuring body having a guide groove disposed therein for mounting said measuring body on one of the pin member and an elongate and straight reference member arranged on a support surface at the front of the pair of vehicle wheels;

a plate-like bridge pivotably mounted on said measuring body and having a pivot axis oriented perpendicular to said guide groove;

a knob rotatably mounted on said measuring body and operatively connected to said bridge such that rotation of said knob by a predetermined amount pivots said bridge through a predetermined angle, said knob being configured to display on a graduated scale said predetermined angle; and first and second levels disposed on said bridge, said first level being oriented parallel with the pivot axis of said bridge and said second level being oriented perpendicular to said first level.

12. The apparatus of claim 11 wherein said measuring body includes a U-shaped frame having a bottom wall extending between two substantially upright side walls, said bridge being pivotally mounted on said two side walls, and a threaded spindle having one end nonrotatably fastened to said knob and another end threadingly engaged within said bottom wall, said spindle being rotatable with respect to said frame and extending through an opening in said bridge and being perpendicular thereto.

13. The apparatus of claim 12 wherein a spring is disposed between a downwardly facing side of said bridge and said bottom wall for biasing said bridge in a direction away from said bottom wall, and a spacing member is disposed between and engages a downwardly facing side of said knob and an upwardly facing side of said bridge, said knob and said spacing member being disposed to limit pivoting movement of said bridge away from said bottom wall.

14. The apparatus of claim 13 wherein a notch is disposed in said upwardly facing side of said bridge and extends parallel to the pivot axis of said bridge and perpendicular to a rotational axis of said threaded spindle, said spacing member having a straight corner portion engaged within said notch, said notch being configured to prevent movement of said spacer element in a direction generally perpendicular to the pivot axis of said bridge and to permit tilting of said spacer element within said notch during pivoting movement of said bridge.

15. The apparatus of claim 14 wherein a distance between the pivot axis of said bridge and the rotational axis of said threaded spindle is equal to a distance between the pivot axis of said bridge and said notch.

16. The apparatus of claim 11 wherein said measuring body includes a magnetic locking body for locking said measuring body in a desired rotational position on one of the pin member and the reference member, said guide groove being disposed in said magnetic locking body, and said magnetic locking body including a handle for switching a magnetic locking effect of said magnetic locking body on and off.

17. The apparatus of claim 11 further including an elongate, generally cylindrical tube arranged at a front of the pair of wheels of the vehicle such that said tube is parallel with a support surface such as a floor.

* * * * *

UNITED STATES PATENT AND TRADEMARK OFFICE
CERTIFICATE OF CORRECTION

PATENT NO. : 5,862,602
DATED : January 26, 1999
INVENTOR(S) : Torgny Hoervallius It is certified that error appears in the above-identified patent and that said Letters Patent is hereby corrected as shown below:

Column 7, line 48; delete "and is".

Signed and Sealed this

Twenty-first Day of March, 2000

*Attest:*

*Attesting Officer*

Q. TODD DICKINSON

*Commissioner of Patents and Trademarks*